US010020102B2

(12) United States Patent
Hashimoto et al.

(10) Patent No.: US 10,020,102 B2
(45) Date of Patent: Jul. 10, 2018

(54) R-T-B BASED PERMANENT MAGNET AND ROTATING MACHINE

(71) Applicant: TDK CORPORATION, Tokyo (JP)

(72) Inventors: Ryuji Hashimoto, Tokyo (JP); Yasushi Enokido, Tokyo (JP); Kenichi Nishikawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 491 days.

(21) Appl. No.: 14/689,862

(22) Filed: Apr. 17, 2015

(65) Prior Publication Data

US 2015/0303744 A1 Oct. 22, 2015

(30) Foreign Application Priority Data

Apr. 21, 2014 (JP) ................................ 2014-087381

(51) Int. Cl.
*H02K 1/02* (2006.01)
*H01F 1/34* (2006.01)
*C22C 38/00* (2006.01)
*H01F 1/057* (2006.01)
*C22C 33/02* (2006.01)

(52) U.S. Cl.
CPC ........... *H01F 1/34* (2013.01); *C22C 33/0278* (2013.01); *C22C 38/005* (2013.01); *H01F 1/0577* (2013.01); *C22C 2202/02* (2013.01)

(58) Field of Classification Search
CPC ..... H01F 1/34; H01F 1/0577; C22C 2202/02; C22C 33/0278; C22C 38/005; H02K 1/02
USPC .............................. 310/156.43; 252/62.51 R
See application file for complete search history.

(56) References Cited

U.S. PATENT DOCUMENTS

| | | | | | |
|---|---|---|---|---|---|
| 4,770,723 | A | 9/1988 | Sagawa et al. | | |
| 2002/0129874 | A1 * | 9/2002 | Kaneko | B22F 9/008 148/301 | |
| 2004/0154699 | A1 | 8/2004 | Chen et al. | | |
| 2007/0102069 | A1 * | 5/2007 | Hidaka | C22C 38/005 148/302 | |
| 2012/0169170 | A1 | 7/2012 | Sakurada et al. | | |
| 2013/0162089 | A1 | 6/2013 | Komuro et al. | | |
| 2013/0271249 | A1 | 10/2013 | Suzuki et al. | | |

FOREIGN PATENT DOCUMENTS

| | | | | | |
|---|---|---|---|---|---|
| EP | 2302646 | A1 * | 3/2011 | H01F 1/0577 | |
| JP | S5946008 | A | 3/1984 | | |
| JP | 10068052 | A * | 3/1998 | H01F 1/0577 | |
| JP | 2007-524986 | A | 8/2007 | | |
| JP | 2009-302262 | A | 12/2009 | | |
| JP | 2010-034522 | A | 2/2010 | | |
| JP | 2010-045068 | A | 2/2010 | | |
| JP | 2010-074084 | A | 4/2010 | | |
| JP | 2011-159981 | A | 8/2011 | | |
| JP | 2013-135542 | A | 7/2013 | | |
| WO | 2011/030387 | A1 | 3/2011 | | |
| WO | 2012/090765 | A1 | 7/2012 | | |

OTHER PUBLICATIONS

Aug. 5, 2014 Office Action issued in Japanese Patent Application No. 2014-087381.
Dec. 9, 2014 Office Action issued in Japanese Patent Applicaiton No. 2014-087381.

* cited by examiner

*Primary Examiner* — Alex W Mok
(74) *Attorney, Agent, or Firm* — Oliff PLC

(57) ABSTRACT

The present invention provides an R-T-B based permanent magnet suitable as a magnet with a variable magnetic force for a motor with variable magnetic flux, which has a high residual magnetic flux density, a low coercivity, and a magnetic force that can be reversibly varied by a small external magnetic field. A permanent magnet with a high residual magnetic flux density and a low coercivity that is suitable as a variable magnet for a motor with variable magnetic flux can be obtained, by selecting the rare earth elements consisting of one or more of Y, La and Ce for a predetermined amount of the rare earth element(s) R in the R-T-B based permanent magnet, and further adding a predetermined amount of the additive element(s) which is at least one of Al, Cu, Zr, Hf and Ti.

4 Claims, No Drawings

R-T-B BASED PERMANENT MAGNET AND ROTATING MACHINE

The present invention relates to an R-T-B based permanent magnet.

BACKGROUND

It is well known that an R-T-B based permanent magnet (wherein R represents a rare earth element, T represents Fe or Fe with part of it substituted by Co) with a tetragonal compound $R_2T_{14}B$ as its main phase has excellent magnetic properties, and is a representative permanent magnet with high performance since it was invented in 1982 (Patent Document 1: JP S59-46008A).

The R-T-B based magnets with rare earth element(s) R composed of Nd, Pr, Dy, Ho, Tb have a large magnetic anisotropy field Ha and are preferred as a material for a permanent magnet. Among them, the Nd—Fe—B based magnet with Nd as the rare earth element(s) R is widely used, because it has a good balance among the saturation magnetization Is, the Curie temperature Tc and the magnetic anisotropy field Ha, and is better in resource amount and corrosion resistance than R-T-B based permanent magnets using other rare earth elements R.

As a power unit used in people's livelihood, industries and transportation equipments, the permanent magnet synchronous motor has been used. However, the permanent magnet synchronous motor in which the magnetic field generated by the permanent magnet is constant is hard to drive, as the induced voltage increases in proportion to the rotational speed. Thus, when the permanent magnet synchronous motor is operated in an intermediate/high speed region or under a low load, it is necessary to perform a field-weakening control which cancels out the magnetic flux of the permanent magnet with the magnetic flux generated by the armature current, so that the induced voltage will never exceed the supply voltage. As a result, there is a problem that the efficiency of the motor will decrease.

In order to solve the problem mentioned above, a motor with variable magnetic flux using a magnet in which the magnetic force changes reversibly when an external magnetic field is applied (a magnet with variable magnetic force) is developed. When the motor with variable magnetic flux is operated in the intermediate/high speed region or under a low load, the decrease of efficiency in the motor due to the field-weakening effect in the prior art can be inhibited by reducing the magnetic force of the magnet with variable magnetic force.

PATENT DOCUMENT

Patent Document 1: JP S59-46008A
Patent Document 2: JP 2010-34522A
Patent Document 3: JP 2009-302262A In the motor with variable magnetic flux, a stationary magnet with a fixed magnetic force and a variable magnet with variable magnetic force are used in combination. In order to obtain a high output and a high efficiency of the motor with variable magnetic flux, the variable magnet is required to provide a magnetic flux equal to that of the stationary magnet. However, it is necessary to control the magnetization state by a small external magnetic field which can be applied in a state that the variable magnet is disposed inside a motor. In other words, magnetic properties such as a high residual magnetic flux density and a low coercivity are required in the variable magnet.

In Patent Document 2, a motor with variable magnetic flux using a Sm—Co based permanent magnet as the variable magnet has been disclosed, and the efficiency of the motor can be improved by using an Nd—Fe—B based permanent magnet as the stationary magnet. However, the Sm—Co based permanent magnet used as the variable magnet has a residual magnetic flux density Br of about 1.0 T which is lower than the residual magnetic flux density Br in the Nd—Fe—B based permanent magnet used as the stationary magnet of about 1.3 T. This becomes the reason why the output and the efficiency of the motor decrease.

Patent Document 3 has disclosed a motor with variable magnetic flux using an R-T-B based permanent magnet as the variable magnet, wherein the R-T-B based permanent magnet contains Ce which is a rare earth element R as an essential element. It can be expected that a residual magnetic flux density Br equal to that of the stationary magnet can also be obtained in the variable magnet, by using an R-T-B based permanent magnet with a same structure as the Nd—Fe—B based permanent magnet which is the stationary magnet as the variable magnet. Nevertheless, in Patent Document 3, in order to control the coercivity to a suitably low value for a variable magnet, Ce is used as an essential element of the rare earth element R, and the residual magnetic flux density Br is around 0.80 T to 1.25 T that does not reach the residual magnetic flux density Br of the stationary magnet of Nd—Fe—B based permanent magnet which is about 1.3 T.

SUMMARY

The present invention has been achieved in view of the situation mentioned above. The present invention aims to provide a variable magnet with a high residual magnetic flux density and a low coercivity, which is suitable for use in the motor with variable magnetic flux in which a high efficiency in a wide rotational speed region can be maintained.

In order to solve the above technical problem and achieve the aim of the present invention, the R-T-B based permanent magnet according to the present invention is characterized in that the R-T-B based permanent magnet contains the main phase grains with a composition of $(R1_{1-x}R2_x)_2T_{14}B$ (wherein, R1 is at least one rare earth element that does not include Y, La and Ce, R2 is rare earth element(s) composed of one or more selected from the group consisting of Y, La and Ce, T is one or more transition metal elements including Fe or a combination of Fe and Co as essential element(s), and $0.1 \leq x \leq 5$), and further contains 2 at % to 10 at % of M (wherein, M is at least one element selected from the group consisting of Al, Cu, Zr, Hf and Ti). With such a structure, a variable magnet with a higher residual magnetic flux density and a lower coercivity which is suitable for a motor with variable magnetic flux can be obtained, compared to the conventional R-T-B based permanent magnet.

The inventors of the present invention have found out that when the combination of the composition of the R-T-B based permanent magnet and the additive element(s) is properly selected in the R-T-B based permanent magnet, a permanent magnet with a high residual magnetic flux density and a low coercivity which is suitable as a variable magnet for a motor with variable magnetic flux can obtained. Further, the R-T-B based permanent magnet according to the present invention can be used in various rotating machines, such as a power generator, besides a motor with variable magnetic flux.

It can be considered from the isothermal cross-sectional view of Nd—Fe—B that $Nd_2Fe_{14}B$ relatively stably exists in a wide region. On the other hand, according to the isothermal cross-sectional views of Y—Fe—B, La—Fe—B and Ce—Fe—B, $R2_2Fe_{14}B$ is surrounded by a plurality of alloys and exists in a narrow region. The difference is considered to increase the ratio of the additive element(s) in the main phase grain. As a result, the decrease of the anisotropy and the formation of reverse magnetic domains become easier and a low coercivity can be achieved.

In the R-T-B based permanent magnet according to the present invention, it is preferred that the ratio of m which represents the weight of M (M is at least one element selected from the group consisting of Al, Cu, Zr, Hf and Ti) per area in the grain boundary phase and n which represents the weight of the same per area at a position inside the grain that is 30 nm away from the surface of the main phase grain, i.e., n/m, is 1/3 or more. Within such a range, the ratio of the additive element(s) in the main phase grain is sufficient, and particularly a low coercivity can be obtained.

Thus, in the $Nd_2Fe_{14}B$, even for the additive element(s) which mainly exist in the grain boundary and increase the coercivity, the ratio of the additive element(s) in the main phase grain can be increased and a low coercivity can be achieved, by using proper rare earth element(s) R and additive element(s) in combination.

According to the present invention, a permanent magnet with a high residual magnetic flux density and a low coercivity that is suitable as a variable magnet for a motor with variable magnetic flux can be obtained, by selecting the rare earth elements consisting of one or more from the group consisting of Y, La and Ce as a predetermined amount of the rare earth element(s) R in the R-T-B based permanent magnet, and further adding a predetermined amount of the additive element(s) which is at least one selected from the group consisting of Al, Cu, Zr, Hf and Ti.

DETAILED DESCRIPTION OF EMBODIMENTS

Hereinafter, the embodiments for carrying out the present invention will be described in detail. The present invention is not limited by the disclosure of the following embodiments. In addition, the constituent elements described below may include elements easily assumed by those skilled in the art and elements which are substantially the same. Further, the constituent elements described below can be appropriately combined.

The R-T-B based permanent magnet according to the present embodiment is characterized in that the R-T-B based permanent magnet contains a main phase grains with a composition of $(R1_{1-x},R2_x)_2T_{14}B$ (wherein, R1 is at least one rare earth element that does not include Y, La and Ce, R2 is rare earth element(s) composed of one or more selected from the group consisting of Y, La and Ce, T is one or more transition metal elements including Fe or a combination of Fe and Co as essential element(s), and $0.1\leq x\leq 0.5$), and further contains 2 at % to 10 at % of M which is at least one element selected from the group consisting of Al, Cu, Zr, Hf and Ti.

In the present embodiment, the amount x of R2 in the composition of the main phase grains is in the range of $0.1\leq x\leq 0.5$. If x is less than 0.1, a sufficiently low coercivity can not be achieved. It is considered to be the result of the decrease of the ratio of the additive element(s) in the main phase grains due to the small ratio of Y, La and Ce. If x is more than 0.5, the residual magnetic flux density Br will sharply decrease. The reason is believed to be that in the permanent magnet of $R_2T_{14}B$ the influence of Y, La and Ce which are inferior to Nd in magnetization or anisotropy becomes dominant.

In the present embodiment, 2 at % to 10 at % of M which is at least one element selected from the group consisting of Al, Cu, Zr, Hf and Ti is contained. If the amount of M is less than 2 at %, the amount of the additive element(s) in the main phase grains will be insufficient, and thus a sufficiently low coercivity can not be achieved. On the other hand, if the amount of M is more than 10 at %, it will cause a decrease of orientation and the like, and thus a sufficient residual magnetic flux density Br can not be obtained.

The R-T-B based permanent magnet according to the present embodiment contains 11 at % to 18 at % of rare earth element(s). If the amount of R is less than 11 at %, the formation of $R_2T_{14}B$ phase contained in the R-T-B based permanent magnet will be insufficient and a soft magnetic α-Fe and the like will precipitate, and the coercivity will decrease significantly. On the other hand, if the amount of R exceeds 18 at %, the volume ratio of $R_2T_{14}B$ phase will decrease and the residual magnetic flux density will decrease.

In the present embodiment, the rare earth element(s) may contain impurities derived from raw materials. Further, considering obtaining a magnetic field with high anisotropy, it is preferable that R1 is Nd, Pr, Dy, Ho or Tb. Besides, from the viewpoint of costs of raw materials and corrosion resistance, Nd is more preferable.

T according to the present embodiment is one or more transition metal elements containing Fe or a combination of Fe and Co as essential element(s). The amount of Co is preferred to be 0 at % or more and 10 at % or less relative to that of T. The Curie temperature can be increased by increasing the amount of Co, and thus the decrease of the coercivity relative to the increase of temperature can be suppressed to a small level. In addition, the corrosion resistance of the rare earth based permanent magnet can be improved by increasing the amount of Co.

The R-T-B based permanent magnet according to the present embodiment contains 5 at % to 8 at % of B. In the case that the amount of B is less than 5 at %, a high coercivity can not be obtained. On the other hand, if the amount of B is more than 8 at %, the residual magnetic flux density tends to decrease. Hence, the upper limit of B is set to be 8 at %. Further, part of B may be substituted by C. The substitution amount of C is preferred to be 10 at % or less relative to B.

Rare earth metal or rare earth based alloy, pure iron, ferro-boron or the alloys thereof and the like can be used as the raw metals of the present embodiment. Al, Cu, Zr, Hf, or Ti can be used alone or in an alloy and the like. However, because a part of the raw metals may contain Al, Cu, Zr, Hf or Ti, the purity level of the raw metals should be selected and the total amount of the additive elements should be adjusted to be a predetermined value. In addition, in the case that impurities are mixed during the production process, it is necessary to add the amount of the impurities.

Here, the ratio of the weight m of M which is at least one element selected from the group consisting of Al, Cu, Zr, Hf and Ti per area in the grain boundary phase and the weight n of the same per area at a position inside the grain that is 30 nm away from the surface of the main phase grain, i.e., n/m, is preferably 1/3 or more. Within such a range, the ratio of the additive element(s) in the main phase grain is sufficient, and particularly a low coercivity can be obtained. Such a ratio of the additive element(s) in the main phase grain can be realized by selecting a proper composition and a proper condition of the sintering process.

Hereinafter, preferable examples of the preparation method for the present invention will be described.

In the preparation of the R-T-B based permanent magnet in the present embodiment, first, raw alloy(s) is prepared with which an R-T-B based magnet having a desired composition can be obtained. The raw alloy(s) can be prepared by the strip casting method or other well known melting methods under vacuum or under an inert atmosphere, preferably Ar atmosphere. In the strip casting method, the molten metal obtained by melting the raw metal(s) under a non-oxidative atmosphere such as Ar atmosphere is sprayed to a surface of a rotating roll. The molten metal quenched by the roll is quenched and solidified into a thin plate or a sheet (a scale-like shape). The quenched and solidified alloy is provided with a uniform structure having a grain size of 1 μm to 50 μm. The method for preparing the raw alloy is not limited to the strip casting method, and the raw alloy can also be obtained by melting methods such as the high frequency induction melting method and the like. Further, in order to prevent the segregation after the melting process, for example, the molten metal may be poured on a water cooled copper plate to be solidified. The alloy obtained by the reduction diffusion method can also be used as the raw alloy.

In the case of obtaining the R-T-B based permanent magnet in the present invention, although the so-called single-alloy method for manufacturing a magnet from one kind of alloy is substantially used, the so-called mixing method can also be applied. In the mixing method, an alloy (low-R alloy) for the main phase which mainly contains $R_2T_{14}B$ crystals as the main phase grains and an alloy (high-R alloy) which contains more R than the low-R alloy and efficiently contributes to the formation of the grain boundary are used.

The raw alloy(s) is subjected to a pulverization process. In the case of using the mixing method, the low-R alloy and the high-R alloy are pulverized respectively or together. The pulverization process includes a coarse pulverization step and a fine pulverization step. First, the raw alloy(s) is coarsely pulverized to an extent that a particle diameter of approximately several hundred pm is obtained. The coarse pulverization is preferably performed using a stamp mill, a jaw crusher, a Brown mill or the like in the atmosphere of an inert gas. Before the coarse pulverization, it is effective to perform pulverization by absorbing hydrogen in the raw alloy, then releasing the hydrogen. The purpose for the hydrogen-releasing treatment is to reduce hydrogen that will be the impurities in the rare earth based sintered magnet. The maintaining heating temperature for hydrogen absorption is set to 200° C. or more, preferably 350° C. or more. The maintaining time depends on its relation with maintaining temperature, the thickness of the raw alloy and the like, however it is set to at least 30 minutes or more, preferably 1 hour or more. The hydrogen-releasing treatment is preformed in vacuum or in the gas flow of Ar. Further, the hydrogen-absorbing treatment and the hydrogen-releasing treatment are not essential process. It is also possible to position the hydrogen pulverization as the coarse pulverization and omit a mechanical coarse pulverization.

After the coarse pulverization, it is subjected to the fine pulverization process. During the fine pulverization, a jet mill is mainly used to pulverize the coarse pulverized powder with a particle diameter of approximately several hundred pm to a powder with an average particle diameter of 2.5 μm to 6 μm, preferably 3 μm to 5 μm. The method using a jet mill is to discharge inert gas with high pressure from a narrow nozzle to produce a high speed gas flow, accelerate the coarse pulverized powder with the high speed gas flow, and cause a collision between coarse pulverized powders or a collision between coarse pulverized powders and a target or a container wall.

The wet pulverization may also be applied in the fine pulverization. In the wet pulverization, a ball mill, a wet attritor or the like can be used to pulverize the coarse pulverized powder with a particle diameter of approximately several hundred pm to a fine powder with an average particle diameter of 1.5 μm to 5 μm, preferably 2 μm to 4.5 μm. In the wet pulverization, the pulverization is performed without the exposure of the powder of the magnet to oxygen, so a fine powder with low oxygen concentration can be obtained, by selecting an appropriate dispersion medium.

In order to improve the lubricity and the orientation in the molding process, fatty acids or derivatives thereof or hydrocarbons, for example, stearic acid based substance or oleic acid based substance such as zinc stearate, calcium stearate, aluminum stearate, stearic acid amide, oleic acid amide, ethylene bis(isostearic acid amide), paraffin and naphthalene as hydrocarbons, and the like, can be added in an amount of about 0.01 wt % to 0.3 wt % during a fine pulverization process.

The fine pulverized powder is subjected to a molding process in a magnetic field. In the molding process in a magnetic field, the molding pressure may be set to a range of 0.3 ton/cm$^2$ to 3 ton/cm$^2$ (30 MPa to 300 MPa). The molding pressure may be constant or increased gradually or decreased gradually or irregular from the beginning to the end of the molding process. The lower the molding pressure is, the better the orientation is. However, if the molding pressure is too low, the strength of the molded body will be insufficient, which will cause problems in handling. Thus, considering the above respect, the molding pressure is selected within the range mentioned above. The molded body obtained by molding in a magnetic field usually has a final relative density of 40% to 60%.

The applied magnetic field may be around 960 kA/m to 1600 kA/m. The applied magnetic field is not limited to a static magnetic field, and a pulsed magnetic field can also be used. Further, a static magnetic field and a pulsed magnetic field can also be used in combination.

The molded body is subjected to a sintering process. The sintering process is performed in a vacuum or an inert gas atmosphere. It is necessary to adjust the sintering temperature and the maintaining time for sintering according to many conditions, such as the composition, the pulverization method, the difference between the average particle diameter and the particle size distribution, and the like. However, the sintering process may be performed at a temperature of about 1000° C. to 1200° C. for 1 minute to 20 hours, preferably 10 minutes or less. The maintaining time for sintering is usually 2 hours to 20 hours. However, the concentration of the additive element in the main phase grains can be maintained to a high state, and a low coercivity can be realized by extremely shortening the maintaining time for sintering.

After the sintering process, the obtained sintered body may be subjected to an aging treatment. The process of aging treatment is effective to adjust the coercivity, but the coercivity which can be adjusted by the aging treatment is about 400 kA/m. Thus, it is difficult to decrease the coercivity of the Nd—Fe—B based permanent magnet to a value suitable for the variable magnet used in the motor with variable magnetic flux only by the aging treatment process. That is, the rough adjustment of the coercivity is achieved by the adjustment of the composition, and the aging treatment process remains to a degree of fine adjustment of the coercivity. In this way, a permanent magnet with a high residual magnetic flux density and a low coercivity which is suitable for a variable magnet used for a motor with variable magnetic flux can be obtained by relatively easy preparation processes.

EXAMPLES

Hereinafter, the present invention will be described in detail based on examples and comparative examples. However, the present invention is not limited to the examples described below.

Predetermined amounts of metals of the rare earth elements, electrolytic iron, ferro-boron and additive elements were weighed, and an R-T-B alloy in a shape of thin plate was produced by a strip casting method, so that the composition of the main phase grains became $(R1_{1-x}R2_x)_2T_{14}B$ and predetermined additive elements were added. After the alloy was pulverized to a coarse pulverized powder by heat treating with stirring in a gas flow of hydrogen, oleic acid amide was added as a lubricant and a fine powder (with an average particle diameter of 3 μm) was produced by using a jet mill in a non-oxidative atmosphere. The obtained fine powder was filled into a mold (with an opening size of 20 mm×18 mm), and subjected to uniaxial pressing molding with a pressure of 2.0 ton/cm$^2$ under a magnetic field (2 T) applied in a direction perpendicular to the pressing direction. The obtained molded body was heated to a sintering temperature and was kept for a predetermined period, then it was cooled down to a room temperature. Here, the maintaining time under the sintering temperature was set to 4 levels of 1 minute, 10 minutes, 30 minutes and 150 minutes. Additionally, the sintering temperature was set to 2 levels of 1090° C. and 1190° C. Next, aging treatments at 850° C. for 1 hour and at 530° C. for 1 hour were performed to obtain the sintered body.

Here, Fe was selected as T. The preparations were performed with various combinations of the species and amounts of R1, R2 and the additive elements, the sintering time and the sintering temperature shown in Table 1. Here, in the case that a plurality of elements as R2 was contained, the value of each element of R2 represented the ratio within R2. Similarly, in the case that a plurality of additive elements was contained, the value of each element of the additive elements represented the ratio within the additive elements.

TABLE 1

| | Species of R1 | Species of R2 | X | Species of additive element | Additive amount (at %) | Sintering time (minute) | Sintering temperature (° C.) |
|---|---|---|---|---|---|---|---|
| Example 1 | Nd | Y | 0.25 | Al | 6 | 1 | 1090 |
| Example 2 | Nd | Ce | 0.25 | Al | 6 | 1 | 1090 |
| Example 3 | Nd | La | 0.25 | Al | 6 | 1 | 1090 |
| Example 4 | Nd | Y0.5Ce0.25La0.25 | 0.25 | Al | 6 | 1 | 1090 |
| Example 5 | Nd | Y0.5Ce0.25La0.25 | 0.25 | Cu | 6 | 1 | 1090 |
| Example 6 | Nd | Y0.5Ce0.25La0.25 | 0.25 | Zr | 6 | 1 | 1090 |
| Example 7 | Nd | Y0.5Ce0.25La0.25 | 0.25 | Al0.5Cu0.25Zr0.25 | 6 | 1 | 1090 |
| Example 8 | Nd | Y0.5Ce0.25La0.25 | 0.25 | Zr0.5Ti0.25Hf0.25 | 6 | 1 | 1090 |
| Example 9 | Nd | Y0.5Ce0.25La0.25 | 0.50 | Al0.5Cu0.25Zr0.25 | 6 | 1 | 1090 |
| Example 10 | Nd | Y0.5Ce0.25La0.25 | 0.10 | Al0.5Cu0.25Zr0.25 | 6 | 1 | 1090 |
| Example 11 | Nd | Y0.5Ce0.25La0.25 | 0.25 | Al0.5Cu0.25Zr0.25 | 10 | 1 | 1090 |
| Example 12 | Nd | Y0.5Ce0.25La0.25 | 0.25 | Al0.5Cu0.25Zr0.25 | 2 | 1 | 1090 |
| Example 13 | Nd | Y0.5Ce0.25La0.25 | 0.25 | Al0.5Cu0.25Zr0.25 | 6 | 10 | 1090 |
| Example 14 | Nd | Y0.5Ce0.25La0.25 | 0.25 | Al0.5Cu0.25Zr0.25 | 6 | 30 | 1090 |
| Example 15 | Nd | Y0.5Ce0.25La0.25 | 0.25 | Al0.5Cu0.25Zr0.25 | 6 | 150 | 1090 |
| Example 16 | Nd | Y0.5Ce0.25La0.25 | 0.25 | Al0.5Cu0.25Zr0.25 | 6 | 1 | 1190 |
| Example 17 | Nd | Y0.25Ce0.5La0.25 | 0.25 | Al0.5Cu0.25Zr0.25 | 6 | 1 | 1090 |
| Example 18 | Nd | Y0.25Ce0.25La0.5 | 0.25 | Al0.5Cu0.25Zr0.25 | 6 | 1 | 1090 |
| Example 19 | Nd | Y0.5Ce0.25La0.25 | 0.25 | Al0.25Cu0.5Zr0.25 | 6 | 1 | 1090 |
| Example 20 | Nd | Y0.5Ce0.25La0.25 | 0.25 | Al0.25Cu0.25Zr0.5 | 6 | 1 | 1090 |
| Example 21 | Pr | Y0.5Ce0.25La0.25 | 0.25 | Al0.5Cu0.25Zr0.25 | 6 | 1 | 1090 |
| Comparative Example 1 | Nd | — | 0.00 | Al0.5Cu0.25Zr0.25 | 6 | 1 | 1090 |
| Comparative Example 2 | Nd | Pr | 0.25 | Al0.5Cu0.25Zr0.25 | 6 | 1 | 1090 |
| Comparative Example 3 | Nd | Y0.5Ce0.25La0.25 | 0.55 | Al0.5Cu0.25Zr0.25 | 6 | 1 | 1090 |
| Comparative Example 4 | Nd | Y0.5Ce0.25La0.25 | 0.05 | Al0.5Cu0.25Zr0.25 | 6 | 1 | 1090 |
| Comparative Example 5 | Nd | Y0.5Ce0.25La0.25 | 0.25 | Al0.5Cu0.25Zr0.25 | 13 | 1 | 1090 |
| Comparative Example 6 | Nd | Y0.5Ce0.25La0.25 | 0.25 | Al0.5Cu0.25Zr0.25 | 1 | 1 | 1090 |

For the prepared samples, analysis of the cross-sectional composition was conducted in order to study the distribution states of the additive elements. In the analysis, first, the sample was processed using a focused ion beam device, and observation was performed using a scanning transmission electron microscope (STEM). Further, element analysis was performed by an energy dispersive spectroscopy X-ray analysis (EDS). The distribution of the additive elements was confirmed by calculating the ratio n/m of the weight m of M which is at least one element selected from the group consisting of Al, Cu, Zr, Hf and Ti per area in the grain boundary phase and the weight n of the same per area at a position inside the grain that is 30 nm away from the surface of the main phase grain. In addition, in the case that there is a plurality of additive elements, the ratio n/m of each element was calculated and added together. The spot diameter of EDS was set to 2 nm, in the grain boundary phase a quantitative analysis was conducted in a region of 50 nm in the direction parallel to the surface of the main phase grains, and a quantitative analysis was conducted in a region of 50 nm in the main phase grains, and n and m were calculated. As for each sample, the same measurement was performed in 5 spots, and the average value of the results was calculated. In addition, variation of the values in the measurement was less than ±10%, and thus it was considered that the detection could be sufficiently performed. The results were shown in Table 2.

TABLE 2

| | Ratio n/m of additive elements in grain boundary phase and those in main phase grains |
|---|---|
| Example 1 | 0.53 |
| Example 2 | 0.53 |
| Example 3 | 0.53 |
| Example 4 | 0.54 |
| Example 5 | 0.54 |
| Example 6 | 0.54 |
| Example 7 | 0.55 |
| Example 8 | 0.55 |
| Example 9 | 0.60 |
| Example 10 | 0.41 |
| Example 11 | 0.59 |
| Example 12 | 0.49 |
| Example 13 | 0.51 |
| Example 14 | 0.30 |
| Example 15 | 0.25 |
| Example 16 | 0.53 |
| Example 17 | 0.54 |
| Example 18 | 0.54 |
| Example 19 | 0.54 |
| Example 20 | 0.54 |
| Example 21 | 0.54 |
| Comparative Example 1 | 0.09 |
| Comparative Example 2 | 0.10 |
| Comparative Example 3 | 0.55 |
| Comparative Example 4 | 0.20 |
| Comparative Example 5 | 0.54 |
| Comparative Example 6 | 0.39 |

It could be clearly known from the results of Examples and Comparative Examples that when the composition fell within the scope of claim 1 and the maintaining time for sintering was short enough, the ratio of the additive elements in the main phase grains became higher.

The magnetic properties of the sintered body were measured by a BH tracer. All measurements were performed at 23° C. The results were shown in Table 3.

TABLE 3

| | Residual magnetic flux density Br (mT) | Coercivity HcJ (kA/m) |
|---|---|---|
| Example 1 | 1312 | 209 |
| Example 2 | 1309 | 207 |
| Example 3 | 1311 | 209 |
| Example 4 | 1310 | 206 |
| Example 5 | 1311 | 206 |
| Example 6 | 1312 | 207 |
| Example 7 | 1312 | 201 |
| Example 8 | 1308 | 203 |
| Example 9 | 1270 | 191 |

TABLE 3-continued

| | Residual magnetic flux density Br (mT) | Coercivity HcJ (kA/m) |
|---|---|---|
| Example 10 | 1321 | 280 |
| Example 11 | 1271 | 190 |
| Example 12 | 1311 | 285 |
| Example 13 | 1293 | 220 |
| Example 14 | 1290 | 350 |
| Example 15 | 1288 | 358 |
| Example 16 | 1305 | 210 |
| Example 17 | 1310 | 205 |
| Example 18 | 1311 | 204 |
| Example 19 | 1312 | 205 |
| Example 20 | 1310 | 203 |
| Example 21 | 1300 | 215 |
| Comparative Example 1 | 1371 | 875 |
| Comparative Example 2 | 1342 | 881 |
| Comparative Example 3 | 980 | 279 |
| Comparative Example 4 | 1322 | 730 |
| Comparative Example 5 | 809 | 244 |
| Comparative Example 6 | 1311 | 599 |

It could be clearly seen from the results of Examples and Comparative Examples that when the composition fell within the scope of claim 1, a high residual magnetic flux density and a low coercivity could be achieved. Further, in the case of having a composition in the range of claim 1 and a distribution of the additive elements of claim 2, a high residual magnetic flux density and a low coercivity could be realized particularly.

As described above, the R-T-B based permanent magnet according to the present invention has a high residual magnetic flux density, and its magnetic force can be reversibly varied by a small external magnetic field. Thus, such a permanent magnet can be suitably used as a magnet with variable magnetic force for a motor with variable magnetic flux which can provide a high efficiency in the operation of people's livelihood, industries, transportation equipments and the like where variable speed is needed.

What is claimed is:

1. An R-T-B based permanent magnet comprising:

main phase grains with a composition of $(R1_{1-x}R2_x)_2T_{14}B$; and 2 at % to 10 at % of M, wherein R1 is at least one rare earth element that does not include Y, La and Ce, R2 is rare earth element(s) consisting of at least one of Y, La and Ce, T is at least one transition metal elements including Fe or a combination of Fe and Co as essential element(s), and $0.1 \leq x \leq 0.5$, M is at least one element selected from the group consisting of Al, Cu, Zr, Hf and Ti, and the ratio of n to m is 1/3 or more, where m is the weight of M per area in the grain boundary phase, and n is the weight of the same per area at a position inside the grain that is 30 nm away from the surface of the main phase grain.

2. A rotating machine comprising the R-T-B based permanent magnet according to claim 1.

3. The R-T-B based permanent magnet according to claim 1, wherein a ratio of n to m is in a range of 0.41 to 0.60.

4. A rotating machine comprising the R-T-B based permanent magnet according to claim 3.

* * * * *